United States Patent [19]
Lee

[11] Patent Number: 5,824,896
[45] Date of Patent: Oct. 20, 1998

[54] MEASURE DRIVING APPARATUS AND MEASURE SIGNAL GENERATING APPARATUS OF NON-CONTACT SYSTEM, USING WAVE OF INCLINED ROTOR

[76] Inventor: Kyu-heyng Lee, 201-1310, 2nd Shiyoung Apt., #567, Ssangyong-dong, Cheonan-city chungeheongnam-do, Rep. of Korea

[21] Appl. No.: 683,813

[22] Filed: Jul. 16, 1996

[51] Int. Cl.$^6$ ....................................................... G01F 3/32
[52] U.S. Cl. ............................................................... 73/238
[58] Field of Search ............................... 73/238, 237, 236, 73/235, 239, 240, 241, 257, 258

[56] References Cited

U.S. PATENT DOCUMENTS

| 528,038 | 10/1894 | Steed ........................................... | 73/940 |
| 1,889,190 | 11/1932 | Brandl et al. ............................... | 73/238 |
| 5,495,756 | 3/1996 | Robitaille et al. ......................... | 73/257 |
| 5,567,876 | 10/1996 | Holmes-Higgin et al. ................ | 73/257 |

*Primary Examiner*—Richard Chilcot
*Assistant Examiner*—Jewel Thompson
*Attorney, Agent, or Firm*—Dilworth & Barrese

[57] ABSTRACT

The present invention provides a flow measuring machine measuring a flowing amount of fluid or gas, and more particularly to a measure driving apparatus for converting a flowing amount into a mechanical momentum, by wave vibration and for transferring the mechanical momentum to a signal generating apparatus, and a measure signal generating apparatus for transferring a turning effect of a rotor in a non-contact system to a sender to output a turning signal. The machine of the present invention more precisely converts the flowing force of the fluid or gas into a vibration force of wave motion of the rotor, thereby getting a precise measure. Further, since the rotor performs a line contact rolling motion with a housing, a driving loss due to friction can be reduced. Also since the rotor can be supported by a bearing, a pressure loss of the fluid due to rotor tare can be reduced, and since the flowing force of the flowing amount is transferred to an outer circumferential surface of the rotor right away, a degree of precision doesn't fall in spite of variation based a flowing speed. Furthermore, since a plate shape of the rotor is used, there is an advantage that the precise measure is available because the force of the fluid operates largely, plus a small size. The signal generating apparatus of the present machine transmits the rotating number in non-contact system, and thus has an effect that the fluid leakage can be removed by closing tightly the body of the machine. Accordingly, an operating pressure of the body inside gets constant to thereby provide an advantage of the precise measuring degree.

7 Claims, 7 Drawing Sheets

MEASURE DRIVING APPARATUS AND MEASURE SIGNAL GENERATING APPARATUS OF NON-CONTACT SYSTEM, USING WAVE OF INCLINED ROTOR

BACKGROUND OF THE INVENTION

The present invention relates to a machine for measuring a flowing amount of fluid or gas, and more particularly to a measure driving apparatus for converting a flowing amount into a mechanical momentum, by wave vibration according to the fluid or the gas flowing and for transferring the mechanical momentum to a signal generating apparatus and a measure signal generating apparatus for generating a signal indicating the amount of fluid or gas flow flowing through the machine.

Generally, fluid transfer equipment has an attachment to a flow measuring machine in order to measure a flowing amount of the fluid. This machine includes a measure driving apparatus for rotating according to the flowing of the fluid, and a measure signal generating apparatus for measuring the rotating amount of the measure driving apparatus, applying its signal to a controller, and thereby calculating the flowing amount. The most important condition of the flow measuring machine in measuring the flowing amount is how precise the machine converts the flowing amount of the fluid into the mechanical momentum and transfers it to the signal generating apparatus in the measure driving apparatus. Therefore, it is more important the measure driving apparatus in the machine for converting the flowing of the fluid into the mechanical momentum and for driving the signal generating apparatus. Examples of measure driving apparatus include a rotary system, a piston system and a turbine system in fluid systems, and a diaphragm system in gas systems.

In the rotary system, the rotor is inserted into a diaphragm for isolating an influx inlet and an efflux outlet so as to perform an eccentricity motion within a housing inside, and the turning effect according to the eccentricity motion is transmitted to the signal generating apparatus, and the signal generating apparatus calculates the rotating number and measures the flowing amount. The most serious problem in such system is that the measurement can be incorrect according to the fluid pressure change of the fluid due to friction during rotating by a tare of the rotor.

A piston system includes a casing and a plurality of pistons set inside the casing. On one side of the casing, the influx inlet and the influx outlet are formed, and an influx inlet valve and an efflux outlet valve are formed in the piston so as to measure a movement of the piston when the flowing amount flows in and to calculate the flowing amount. At this time, since the fluid pressure of the fluid should push a load of the piston, a large fluid pressure is needed when operating. In such system, an exact measuring amount can be obtained when a jetting amount is the same according to synchronization to the pressure of the fluid, but the measuring precision degree falls without getting the same jetting amount as the fluid pressure owing to a friction loss by a constant pressure.

In the turbine system, a pressure sensor is placed in the front and back of a propeller, and a rotating number of the propeller is obtained by computing the pressure difference, and then the fluid amount is measured. Such a system has a drawback that the measuring precision degree falls since the measuring value is different according to the pressure change, and also it may be used only in a constant pressure. Especially, difficulty and high cost in manufacturing is caused since a long flowing pipe is required to lessen the variation of pressure because a variable flowing of the fluid is measured.

The diaphragm system is widely used for measuring gas flow, in which an air-pouched rubber is expanded when the air flows therein by using an elastic characteristic, and then the influx inlet is automatically closed and the efflux outlet opened after the expansion of a constant amount. However, the elastic coefficient value for the rubber changes during use and the change of volume occurs owing to a fatigue limitation of the rubber. Thus, precise measuring is difficult.

Meanwhile, an apparatus for generating a measuring signal by transferring a driving force generated in the driving apparatus, has a problem hat the gas or the fluid in the inside of the body is leaked in a gap that a rotating shaft pierces. The rotating shaft of the driving apparatus conventionally pierces a body of the machine and is used as a driving shaft of the sender. Due to such leakage, the inside pressure of the body is changed, and then a direct problem in the rotating number of the driving apparatus is caused, thereby decreasing the degree of measuring precision.

SUMMARY OF THE INVENTION

It is therefore, an object of the present invention to provide a measure driving apparatus, using a wave motion of an inclined rotor, for more precisely converting a flowing amount of fluid or gas into a rotating amount. The driving apparatus includes a diaphragm installed between an influx inlet and an efflux outlet of a housing, into which a loader is inserted and set slantingly, and a conical rocking of 360 degrees is performed by line contact rolling motion according to the flowing of fluid.

It is another object of the present invention to provide a measure signal generating apparatus having a non-contact system in a measuring machine, for closely enclosing a body and transferring the rotating amount of the measure driving apparatus to the sender in non-contact manner, thereby securing a gastight status.

To accomplish the above objects of the present invention, there is provided a measure driving apparatus of a flow measuring machine which uses wave motion of an inclined rotor to convert a flowing amount of fluid or gas into mechanical rotation and providing the converted mechanical rotation to a signal generating apparatus which measures rotating displacement. The measure driving apparatus comprises:

a rotor housing, being in a cylinder shape, having a closed given space and forming an influx hole and an efflux hole on side wall thereof; a diaphragm, attached on the side wall of the rotor housing, for isolating the influx hole and the efflux hole; a rotor, having a radial flute inserted into the diaphragm so as to be flowed upwards and downwards, supported and fixed with an inside wall of the rotor housing so as to be adherence-rocked freely by inclining with a given angle, for performing a conical rocking of 360 degrees according to a flowing of the fluid and rotating the shaft of the signal generating apparatus, wherein the rotor has a shaft projected upwards; and a supporting shaft, shaft-installed in a central lower portion within the rotor housing, for supporting the center of the rotor.

To achieve the above object of the present invention, there is provided a measure signal generating apparatus having a non-contact system in a flow measuring machine, for receiving mechanical rotation of a machine rotor and generating a measure signal. The measure signal generating apparatus comprises:

a first magnet, set in an upper portion of a rotating shaft turning according to rotation of the rotor; a body of the weighing machine, having a closed inner space for housing the first magnet and the rotor; a second magnet, set on the outside of the body confronted with the first magnet, being rotated by induction of the first magnet and transferring the turning effect to a sender; and a sender for receiving the turning effect from the second magnet, and generating and outputting the measure signal.

BRIEF DESCRIPTION OF THE DRAWINGS

The preferred embodiments are described with reference to the drawings wherein.

DETAILED DESCRIPTION OF THE PREFERRED EMBODIMENT

Figure 1A:
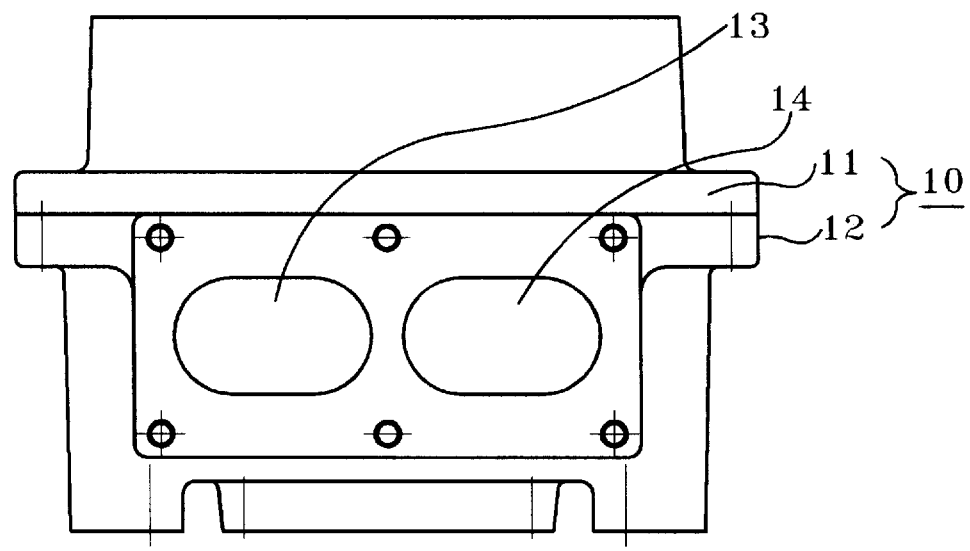
FIG. 1A is a front elevational view of the body of the measure driving apparatus in accordance with the present invention.

A preferred embodiment of the present invention is illustrated in detail referring to the drawings. A flow measuring machine includes a measure driving apparatus for supplying fluid flow through an influx inlet to an efflux outlet, converting this fluid flow into a rotating number, and applying the converted number to a signal generating apparatus. Referring to Figs. from 1 to 4, a structure of the measure driving apparatus of the present invention is explained in detail.

Figure 1B:
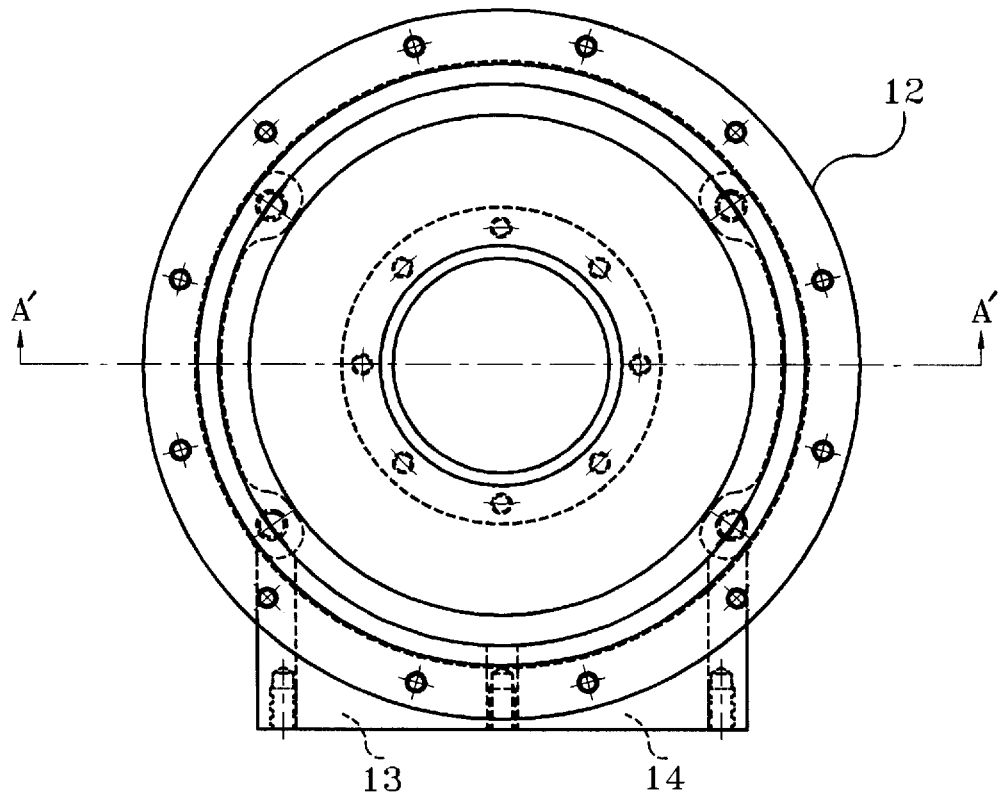
FIG. 1B is a plan view of the lower body portion of the body shown in FIG. 1A.
Figure 1C:
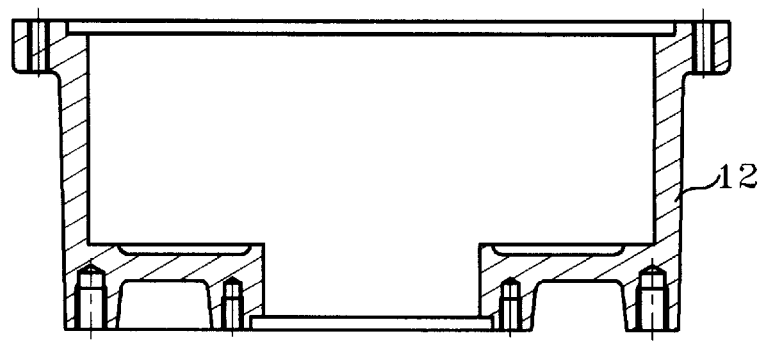
FIG. 1C is a side cross-sectional view taken along lines $A^1$—$A^1$ of FIG. 1B.

FIGS. 1A–C are structural views for a body of the flow measuring machine. FIG. 1A is a front view of a body 10. The body 10 is formed by upper and lower supporters 11 and 12. FIG. 1B is a plan view of the lower supporter 12. FIG. 1C is a sectional view taken along a line A—A shown in FIG. 1B. At the front of the body formed are closely a first influx hole 13 and a first efflux hole 14 through the inside of which they pierce. In the inside of the body 10, a rotor housing (not shown) is housed and fixed inside the body 10.

Figure 2A:
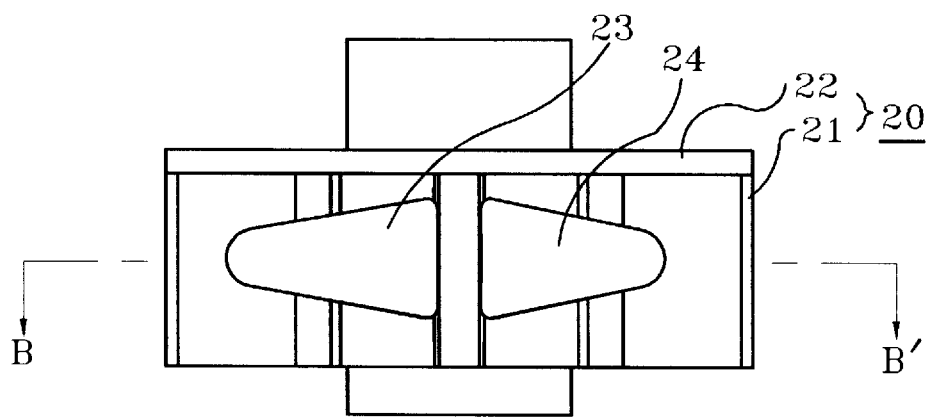
FIG. 2A is a front elevational view of the rotor housing of the measure driving apparatus in accordance with the present invention.
Figure 2B:
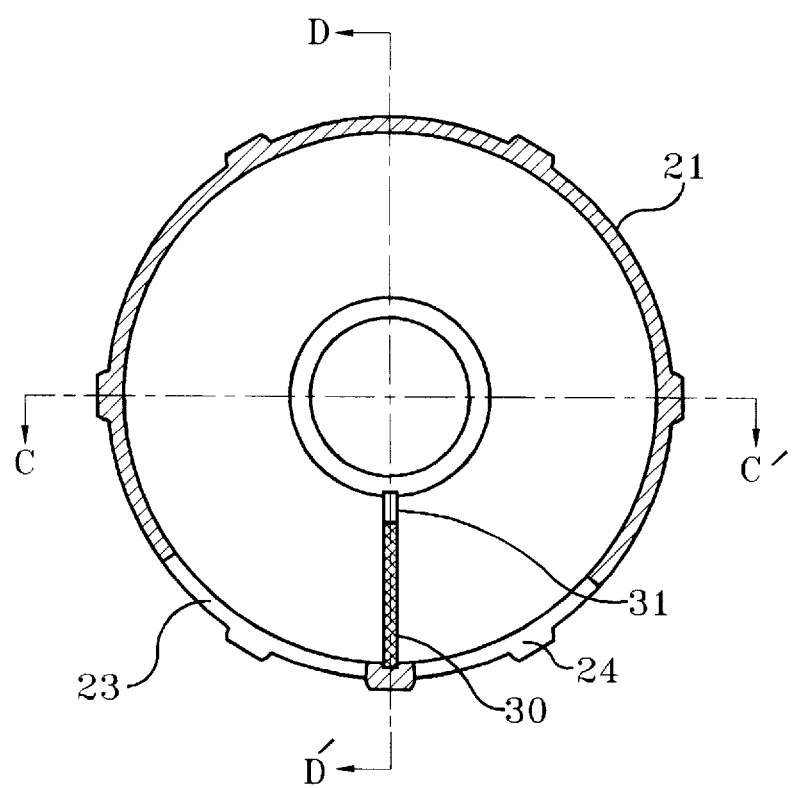
FIG. 2B is a top cross-sectional view of the rotor housing taken along lines B–$B^1$ of FIG. 2A.
Figure 2C:
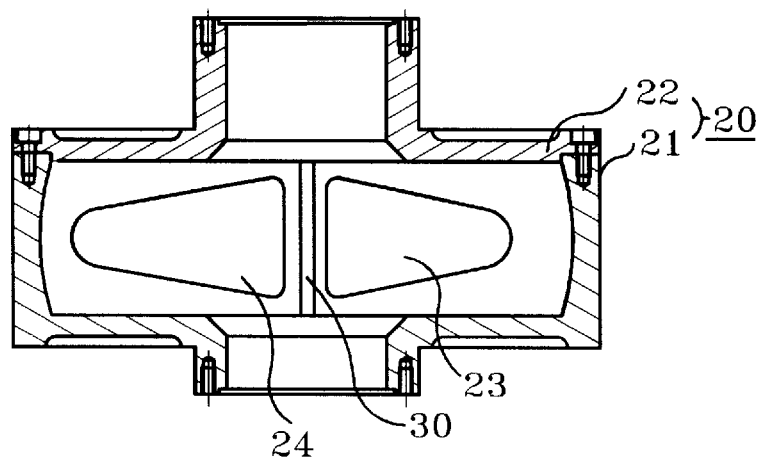
FIG. 2C is a side cross-sectional view of the rotor housing taken along lines C–$C^1$ of FIG. 2B.
Figure 2D:
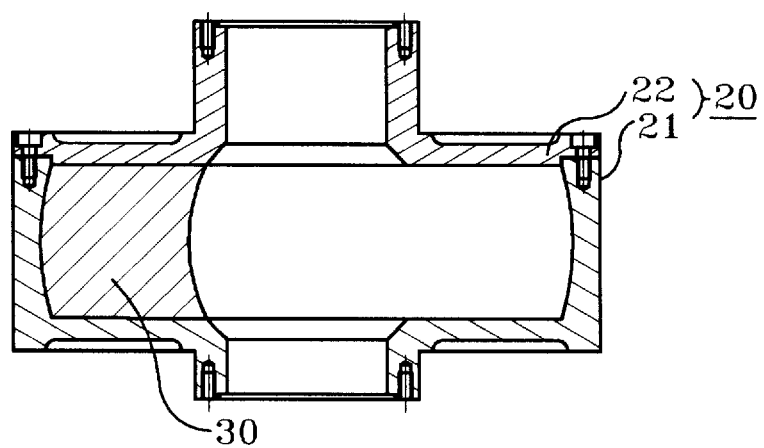
FIG. 2D is a side cross-sectional view of the rotor housing taken along lines D–$D^1$.

FIGS. 2A–D are structural views showing the rotor housing of the flow measuring machine according to the present invention. FIG. 2A is a front view of an external appearance. FIG. 2B is a sectional view taken along a line B–B' shown in FIG. 2A. FIG. 2C is a sectional view taken along a line C–C' shown in FIG. 2B. FIG. 2D is a sectional view taken along a line D–D' shown in FIG. 2B.

A rotor housing 20 is formed by a trunk 21 having a predetermined space and a cover 22 closing an upper portion of the trunk 21. In the front of the trunk 21, a second influx hole 23 and a second efflux hole 24, which are respectively connected through the first influx and efflux holes of the body (not shown) as mentioned above are formed. Accordingly, the fluid flowed in the first influx hole of the body is flowed inside the rotor housing 20 through the second influx hole 23 of the trunk 21, and the fluid flowed into the inside of the rotor housing 20 passes through the second efflux hole 24 of the trunk 21 and goes out through the first efflux hole of the body. The rotor housing 20 composed of the trunk 21 and the cover 22 forms a space that the fluid flowed inside is capable of flowing. Between the second influx hole 23 and the second efflux hole 24, a diaphragm 30 is attached to isolate the second influx hole 23 and the second efflux hole 24. The fluid flowed in the second influx hole is not jetted to the second efflux hole 24 right away, and is jetted through the second efflux hole 24 after circulating the inside of the rotor housing 20. At an inner circumferential surface of the diaphragm 30, formed is a curve 31 for guiding a rocking of the inserted rotor (not shown) upward and downward, a concrete explanation on the rotor will be given referring to FIG. 3.

Figure 3A:
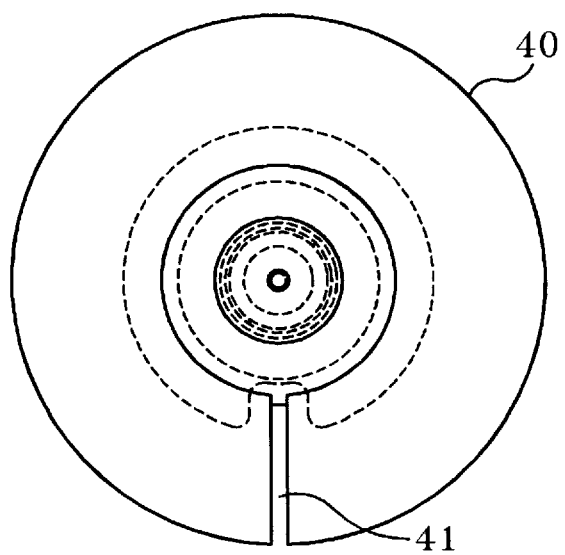
FIG. 3A is a plan view of the rotor of the measure driving apparatus in accordance with the present invention.
Figure 3B:
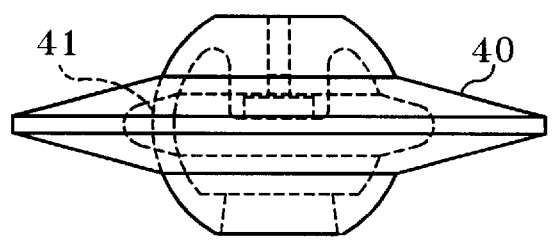
FIG. 3B is a side elevational view of the rotor shown in FIG. 3A.

FIGS. 3A–B are structural views for the rotor of the flow measuring machine according to the present invention, wherein FIG. 3A is a plan view and FIG. 3B is an exterior view shown from a right side of FIG. 3A.

As shown in FIG. 3B, a given portion of the rotor 40 is cut towards a central direction, and the diaphragm shown in FIGS. 2A–D is inserted into a flute 41. The inner of the flute 41 has the same curve line as the above-mentioned curve upward and downward.

Figure 4A:
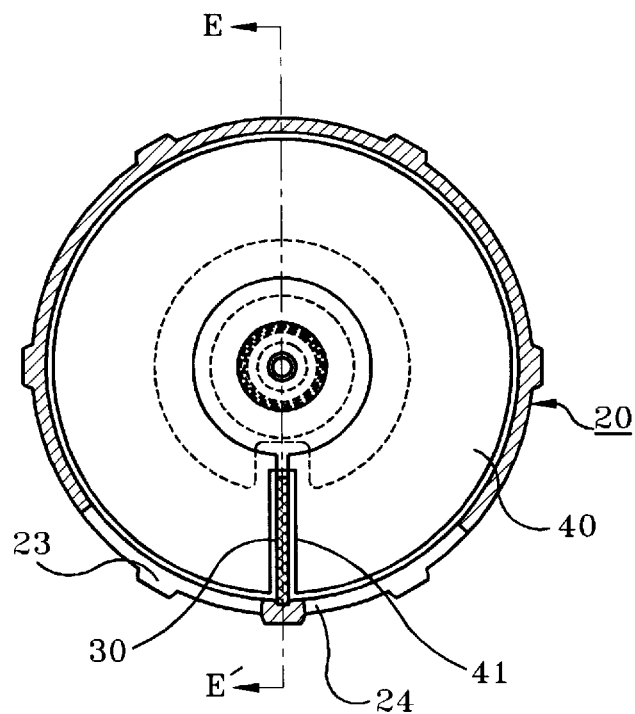
FIG. 4A is a top cross-sectional view of the measure driving apparatus in accordance with the present invention.
Figure 4B:
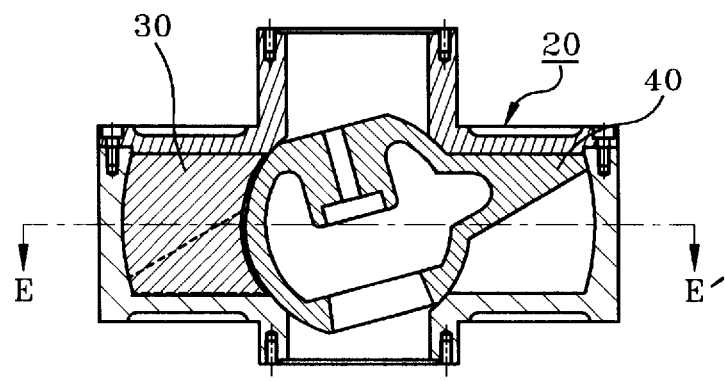
FIG. 4B is a side cross-sectional view of the measuring driving apparatus taken along lines E–$E^1$ shown in FIG. 4A.

FIGS. 4A–B are explanatory views showing a structure of the rotor which is installed in the rotor housing. FIG. 4A is a plan sectional view and FIG. 4B is a sectional view taken along a line E–E' shown in FIG. 4A.

A shaft line of the rotor 40 in the inside of the rotor housing 20 is slanted with a constant angle. That is, the lower end in one side of the rotor 40 is closed to an inner lower face of the rotor housing 20, and another side placed in a diagonal line direction against one side of the rotor housing 20 and closed to an inner upper face of the rotor housing 20. As shown, the rotor 40 goes up and down on the upper and lower sides of the diaphragm 30 inserted into the flute 41, and simultaneously rocks as a wave motion in 360 degrees in a circumferential direction, and thus an upper and lower space volumes of the rotor housing 20 partitioned by the rotor 40 are rotated. Such rotation of the space volume is generated by the fluid flowing.

In additional explanation, in case there is the influx hole 23 at the upper portion partitioned by the rotor 40, the fluid flows in the upper side of the rotor 40, and the rotor 40 wave-vibrates, in sequence, according to the flowing of the fluid, thereby the fluid flowing into the efflux hole 24. At this time, the rotor 40 is positioned in the upper portion of the influx hole 23, and the fluid flows in the lower portion of the rotor 40 through the influx hole 23 to wave-vibrate the rotor 40 is jetted through the efflux hole 24. The rotor 40 wave-vibrates by performing that the fluid alternately flows into the space of the partitioned upper and lower sides, and thus rotates the space volume to jet the fluid through the efflux hole 24. Accordingly, the rotor shaft (not shown) slanted with a given angle, draws a constant radius every one cycle made of the influx and efflux and revolves in a conical shape.

Figure 5:
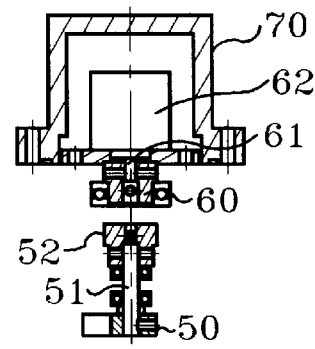
FIG. 5 is a schematic diagram of a measure signal generating apparatus of the present flow measuring machine.

FIG. 5 is a schematic diagram for the measure signal generating apparatus of the present flow measuring machine. A structure of the measure signal generating apparatus according to the present invention is illustrated referring to FIG. 5. The measure signal generating apparatus includes a rotating lever 50 for rotating in a state hung on the rotor shaft, and a rotating shaft 51, to which the rotating lever 50 is fixed, for rotating according to rotation of the rotating lever 50. On the upper portion of the rotating shaft 51 a first magnet 52 is attached. Other components are housed and closed in the inside of the body (not shown) above-mentioned.

A second magnet 60 is constructed isolating in a given interval from the first magnet 52. The second magnet 60 induced from the first magnet 52 rotates, which is attached on an end of a sender shaft 61, and transfers the turning effect of the rotating shaft 51 to the sender 62. Therefore, the sender 62 counts rotating numbers and generates a measure signal. As this sender 62, an encoder is usually used. The sender 62 is preserved by a cover 70 and is fixed to the outside of the body.

Figure 6:
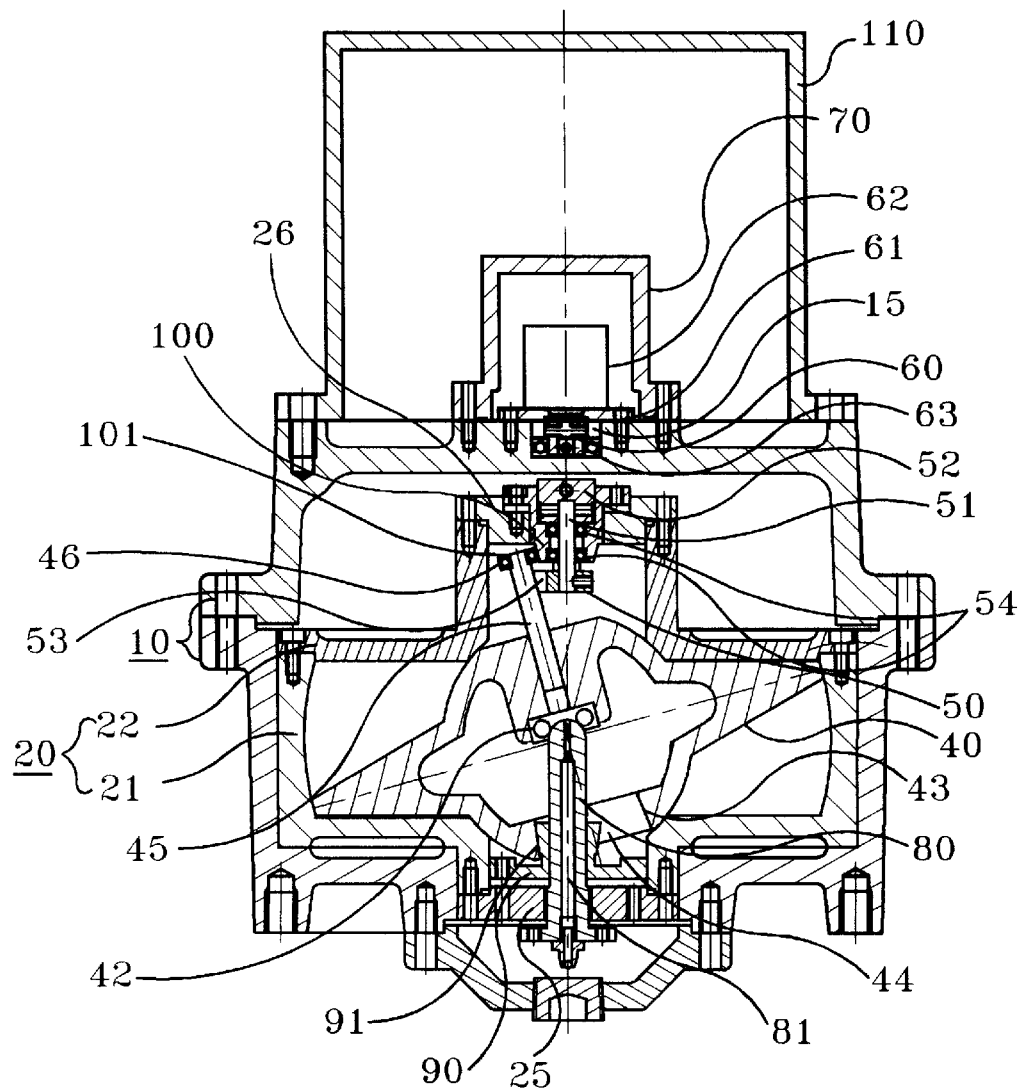
FIG. 6 is an assembly sectional view of the flow measuring machine according to the present invention.

FIG. 6 is a general assembly sectional view of the flow measuring machine constructed by a combination of the measure driving apparatus and the measure signal generating apparatus according to the present invention. The measure driving apparatus and the measure signal generating apparatus according to the present invention can be used independently, but for convenience sake of the explanation, an example applied to the present view shows operating in an integral connection state.

First, a general structure of the flow measuring machine is illustrated. Housed is, in the body 10 of the flow measuring machine, the rotor housing 20 into which a given amount of the fluid flows and which has the flowing state. The rotor housing 20 is composed of the trunk 21 whose upper portion is opened, having a given space, and the cover 22 for closing the upper portion of the trunk 21.

The trunk 21 includes a second influx hole (not shown) into which the fluid flows and a second efflux hole (not shown) for jetting the fluid flowed-in through the second influx hole. The second influx hole and the second efflux hole are closed to each other, between which the diaphragm 30 is fixed to partition two holes. Accordingly, the fluid flowed into the second influx hole is not jetted to the second efflux hole right away, but circulates in the inside of the rotor housing 20 to then be jetted through the second efflux hole.

The inner space of the trunk 21 is in a fashion that the upper and lower portions from the shape of a round ball are removed. The rotor 40 of a plate shape, exactly a shape of a flying saucer, is supported and fixed in this inner space to operate pivotally, freely. Mentioning in detail, a supporting shaft 80 pierces the center portion of the rotor 40 so as to rock maintaining the center and supports to a given portion of the inside. At the inside of the rotor 40 in the support portion, a central bearing 42 is equipped to provide smooth rotating and movement. The supporting shaft 80 includes a supply hole 81 for supplying a lubricating oil along the direction of a shaft line, and the lubricating oil is supplied from a lower portion situated in the outside of the rotor housing 20 to the central bearing 42 so that friction between the supporting shaft 80 and the central bearing 42 may be reduced. The supporting shaft 80 is attached upwards in the center of a rotor housing lower plate 25 which is fixed to a central portion of lower portion of the trunk 21. At the lower outer circumferential of the rotor 40 through which the supporting shaft 80 pierces, formed is a through hole 44 having a lower supporting face 43 inclined with a given angle against the supporting shaft line, so as the rotor 40 to be rocked upwards and downwards. A lower supporting jaw 91 of a lower adherence angle supporting plate 90 is inserted into the through hole 44 in order to support the lower supporting face 43, thereby preventing the friction of the lower circumferential surface of the rotor 40 with trunk 21. That is, a role for controlling the lower adherence angle of the rotor 40 is performed so that the contact friction may be prevented by isolating with an infinitesimal interval between the lower outer circumferential surface of the rotor 40 and a lower face of the trunk 21 of the rotor housing.

On the upper end of the rotor 40, the rotor shaft 45 is shaft-installed in an upward projecting shape, and at the upper end of this projection a bearing 46 is inserted and set. The bearing 46 rotates with adhering closely to an upper supporting jaw 101 of an upper adherence angle supporting plate 100 for controlling an upper adherence angle. The upper adherence angle supporting plate 100 is attached to the center of a rotor housing upper plate 26 and is projected into the inside of the rotor housing 20. In the shaft center of the upper adherence angle supporting plate 100, a rotating shaft 51 is shaft-installed downward in the inside of the rotor housing 20. The rotating lever 50 is fixed on the lower portion of the rotating shaft 51 shaft-installed. A holding hole 53 is formed in the central direction on the outer circumferential of the rotating lever 50, through which the rotor shaft 45 pierces. By the piercing of the rotor shaft 45, the rotating lever 50 operates when the rotor shaft 45 rotates, and such following movement of the rotating lever 50 makes the rotating shaft 51 rotate.

The rotating shaft 51 is supported and fixed to the upper adherence angle supporting plate 100 so as to operate pivotally, which pierces the rotor housing 20. The first magnet 52 is attached on its pierced outer end portion. Accordingly, when the rotating shaft 51 rotates, the first magnet 52 which is pierced, inserted and fixed to its outer circumferential girth, integrally rotates. At this time, in order to smooth the rotation of the rotating shaft 51, the bearings 54 are inserted outside in the rotating shaft 51. Meanwhile, the body 10 of the flow measuring machine houses the rotor housing 20 to close from the outside. Also the first magnet 52 is cut off and closed from the outside. On the outer circumferential portion of the body 10, being confronted with the first magnet 52, a housing hole 15 is formed and is supported by a bearing 63 so that the second magnet 60 may operate pivotally. In a shaft center of the second magnet 60 the sender shaft 61 is inserted and fixed to operate integrally. Accordingly, when the second magnet 60 rotates, the sender shaft 61 rotates, and the second 62 counts its rotating number to generate the measure signal. As such sender 62, an encoder for detecting the rotating number is usually used. Specially, in order to prevent the sender 62 from an impact of the outside or an alien substance, the cover 70 housing the sender 62 is attached to the body 10, and also an electronic displayer cover 110 encloses its outside.

The measure signal generating apparatus of non-contact system according to the present invention transfers the rotating amount of the rotor which is turning according to the flowing of the fluid, to the outside of the body of the flow measuring machine, and generates the measure signal. In the present embodiment, an example on the driving by combining with the measure driving apparatus using the wave motion of an inclined rotor according to the present applicant is provided. However, the present apparatus is applicable to all flow meters for changing the flowing amount of the fluid into the mechanical turning amount and detecting the changed amount.

Operations of the present invention are in detail illustrated below on the basis of FIG. 6 referring to Figs. from 1–5.

When the fluid flows into the inside of the rotor housing 20 through the second influx hole 23, the fluid flows into any one side between the upper portion or the lower portion of the rotor 40. Herewith, let's assume that the fluid flows into the upper portion of the rotor 40.

When the fluid flows into the upper portion of the rotor 40 and is in a flowing state, the rotor 40 performs the line contact rolling motion in the inside of the rotor housing 20 according to a flowing speed, and also rocks upwards and downwards on the supporting shaft 80 to perform the wave motion. By the wave motion, the space volume rotates, and the fluid in the upper portion of the rotor 40 flows and is jetted to the second efflux hole 24. At the same time, since the rotor shaft 45 is slanted with a given angle against the supporting shaft 80, the shaft 45 performs a rotating movement of a conical shape in the center point of the supporting shaft 80. Thereby, the rotating lever 50 with which the rotor shaft 45 is combined, moves together to rotate the rotating shaft 51. Accordingly, the first magnet 52 attached on the outer end of the rotating shaft 51 rotates. At this time, its rotating force is induced to the second magnet 60 situated on the outside of the body 10, and the second magnet 60 rotates in the same rotating number. Therefore, the sender shaft 61 combined to the second magnet 60 revolves, and the sender 62 generates the measure signal. The measure signal of such rotating number is transmitted to a controller (not shown), gains a flowing value via a computing process, and is displayed through a displaying unit of the outside.

As described above, operations that the fluid flows into the upper portion of the rotor 40 and moves in the flowing state to be jetted, and that the fluid is jetted to the lower portion of the rotor 40 in the flowing state, are performed alternately. Such influx and efflux operations in the upper and lower portions of the rotor are continuously repeated in a one cycle.

The flow measuring machine of the present invention more precisely converts the flowing force of the fluid or gas into a vibration force of wave motion of the rotor, to thereby get a precise measure. Furthermore, since the rotor performs the line contact rolling motion with the housing, a driving loss due to friction can be reduced. Also, since the rotor can be supported by the bearing, a pressure loss of the fluid due to rotor tare can be reduced, and since the flowing force of the flowing amount if transferred to the outer circumferential surface of the rotor right away, there is a characteristic that the precision degree doesn't fall in spite of variation based on the flowing speed. Furthermore, since a plate shape of the rotor is used, there is an advantage that the precise measure is available because the force of the fluid operates largely, plus a small size. The signal generating apparatus of the present weighing machine transmits the rotating number in non-contact system, and thus has an effect that the fluid leakage can be removed by closing tightly the body of the weighing machine. Accordingly, an operating pressure of the body inside gets constant to thereby provide an advantage of the precise measuring degree.

While only certain embodiments of the invention have been specifically described herein, it will apparent that numerous modifications may be made thereto without departing from the spirit and scope of the invention.

What is claimed is:

1. A driving apparatus for a flow measuring machine that uses wave motion of an inclined rotor to convert a flow of fluid or gas into mechanical rotation and provides the converted mechanical rotation to a signal generating apparatus which measures a rotating displacement, said driving apparatus comprising:

a rotor housing having a cylindrical shape defining a closed given space, said rotor housing having an influx hole and an efflux hole on a side wall thereof;

a diaphragm attached on the side wall of said rotor housing, for isolating said influx hole and said efflux hole;

a rotor having a radial flute positioned about said diaphragm, said rotor being supported within said closed given space of said rotor housing so as to be driven in a conical rocking motion of 360 degrees by the flowing of said fluid, said rotor having a shaft adapted to operatively engage a rotating shaft of the signal generating apparatus; and a supporting shaft positioned in a central lower portion of said rotor housing, said supporting shaft supporting the center of said rotor.

2. The driving apparatus as claimed in claim 1, wherein said rotor housing further comprises upper and lower adherence angle supporting plates which project into central upper and lower portions of said rotor housing, said upper and lower adherence angle supporting plates being formed by upper and lower supporting jaws having a predetermined slanted angle to control an incline of the rotor.

3. The driving apparatus as claimed in claim 2, wherein said rotor comprises, in its lower center position, a through hole having a supporting face positioned to contact said rotor housing, into which said lower supporting jaw is inserted in order to support said lower supporting face.

4. The driving apparatus as claimed in claim 2, wherein said shaft of the rotor further comprises, in its upper portion, a bearing in contact with said upper supporting jaw, said bearing being rotated and guided along said upper supporting jaw.

5. The driving apparatus as claimed in claim 1, wherein said signal generating apparatus includes a rotating lever operatively connected to said rotating shaft, said rotating lever having a holding hole through which said shaft of the rotor pierces to rotate said rotating shaft.

6. The driving apparatus as claimed in claim 1, wherein said rotor comprises a central bearing positioned in a given portion of an inner circumference of said rotor for supporting said supporting shaft.

7. The driving apparatus as claimed in claim 6, wherein said supporting shaft is equipped with a supplying hole for supplying a lubricating oil to said central bearing along a shaft line.

* * * * *